US012674942B2

(12) United States Patent
Arao et al.

(10) Patent No.: US 12,674,942 B2
(45) Date of Patent: Jul. 7, 2026

(54) OPTICAL CONNECTION COMPONENT AND OPTICAL CONNECTION STRUCTURE

(71) Applicant: SUMITOMO ELECTRIC INDUSTRIES, LTD., Osaka (JP)

(72) Inventors: Hajime Arao, Osaka (JP); Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 223 days.

(21) Appl. No.: 18/287,792

(22) PCT Filed: May 13, 2022

(86) PCT No.: PCT/JP2022/020266
§ 371 (c)(1),
(2) Date: Oct. 20, 2023

(87) PCT Pub. No.: WO2022/249903
PCT Pub. Date: Dec. 1, 2022

(65) Prior Publication Data
US 2024/0201452 A1     Jun. 20, 2024

(30) Foreign Application Priority Data

May 24, 2021     (JP) ................................. 2021-087091

(51) Int. Cl.
*G02B 6/36*          (2006.01)
*G02B 6/38*          (2006.01)
(52) U.S. Cl.
CPC ......... *G02B 6/3885* (2013.01); *G02B 6/3644* (2013.01); *G02B 6/3883* (2013.01)
(58) Field of Classification Search
USPC ........................................................ 385/78
See application file for complete search history.

(56) References Cited

U.S. PATENT DOCUMENTS 4,830,456 A * 5/1989 Kakii ..................... G02B 6/389
                                                    385/59
5,602,951 A * 2/1997 Shiota .................. G02B 6/3839
                                                    385/71
(Continued)

FOREIGN PATENT DOCUMENTS

JP      2000-066062 A      3/2000
JP      2004-020656 A      1/2004
(Continued)

OTHER PUBLICATIONS

Ho et al., "Single and Multi-Scan Femtosecond Laser Writing for Selective Chemical Etching of Glass Micro-Channels," Applied Physics A, May 2007, vol. 106, No. 1.

*Primary Examiner* — Kaveh C Kianni
(74) *Attorney, Agent, or Firm* — Oliff PLC

(57)          ABSTRACT

An optical connection component according to one embodiment includes three or more cores that transmit optical signals along a first direction. The optical connection component includes a first surface extending in a second direction intersecting the first direction and in a third direction intersecting both the first direction and the second direction; and a second surface extending in the second direction and the third direction and arranged with the first surface along the first direction. Each of the cores extends from the first surface to the second surface along the first direction. The three or more cores are disposed not to be arranged on one straight line on each of the first surface and the second surface. A core disposition on the first surface defined by the three or more cores is different from a core disposition on the second surface defined by the three or more cores.

12 Claims, 12 Drawing Sheets

(56) References Cited

U.S. PATENT DOCUMENTS

| | | | | |
|---|---|---|---|---|
| 5,712,937 | A * | 1/1998 | Asawa | G02B 6/12007 |
| | | | | 385/12 |
| 5,815,621 | A * | 9/1998 | Sakai | G02B 6/3834 |
| | | | | 264/1.24 |
| 7,149,400 | B2 * | 12/2006 | Lange | G02B 6/3897 |
| | | | | 385/60 |
| 8,270,784 | B2 * | 9/2012 | Thomson | G02B 6/125 |
| | | | | 385/31 |
| 2002/0146215 | A1 * | 10/2002 | Ogawa | G02B 6/3839 |
| | | | | 385/83 |
| 2004/0062490 | A1 * | 4/2004 | Gimbel | G02B 6/3885 |
| | | | | 385/78 |
| 2009/0116793 | A1 * | 5/2009 | Nishimura | G02B 6/3885 |
| | | | | 385/78 |
| 2012/0257860 | A1 * | 10/2012 | Li | G02B 6/3885 |
| | | | | 385/83 |
| 2013/0266271 | A1 * | 10/2013 | Li | G02B 6/3882 |
| | | | | 385/83 |
| 2018/0067265 | A1 * | 3/2018 | Akiyama | G02B 6/305 |
| 2020/0379187 | A1 | 12/2020 | Matsui et al. | |
| 2021/0018697 | A1 * | 1/2021 | Evans | G02B 6/406 |
| 2021/0141164 | A1 * | 5/2021 | Nakanishi | G02B 6/3636 |
| 2022/0026641 | A1 * | 1/2022 | Namekawa | G02B 6/40 |
| 2023/0125413 | A1 * | 4/2023 | Omura | G02B 6/3672 |
| 2023/0152305 | A1 * | 5/2023 | Venkatarayalu | G01N 21/45 |
| | | | | 435/4 |
| 2023/0304937 | A1 * | 9/2023 | Venkatarayalu | G01N 21/77 |
| 2024/0085408 | A1 * | 3/2024 | Venkatarayalu | B01L 3/50273 |
| 2025/0058315 | A1 * | 2/2025 | Feng | G01N 1/4077 |
| 2025/0198906 | A1 * | 6/2025 | Feng | G01N 15/1433 |

FOREIGN PATENT DOCUMENTS

| | | |
|---|---|---|
| JP | 2004-061772 A | 2/2004 |
| JP | 2009-511996 A | 3/2009 |
| JP | 2011-237573 A | 11/2011 |
| WO | 2007046100 A2 | 4/2007 |
| WO | 2018/099575 A1 | 6/2018 |
| WO | 2019/131441 A1 | 7/2019 |

* cited by examiner

OPTICAL CONNECTION COMPONENT AND OPTICAL CONNECTION STRUCTURE

TECHNICAL FIELD

The present disclosure relates to an optical connection component and an optical connection structure.

BACKGROUND ART

Patent Literature 1 describes an optical connector device. The optical connector device includes an optical waveguide that transmits an optical signal. The optical waveguide has a first surface to which a multicore fiber is optically connected, and a second surface to which each of a plurality of single-core fibers placed in a V-groove array and arranged in a row is optically connected. A core that transmits an optical signal incident on the optical waveguide from the multicore fiber through the first surface is branched between the first surface and the second surface. A plurality of the branched cores extend toward the plurality of respective single-core fibers. Non-Patent Literature 1 describes that glass is irradiated with a femtosecond laser and the irradiated portion is selectively etched.

CITATION LIST

Patent Literature

Patent Literature 1: Specification of U.S. Pat. No. 8,270,784

Non Patent Literature

Non-Patent Literature 1: "Single and Multi-Scan Femtosecond Laser Writing for Selective Chemical Etching of Glass Micro-Channels" Stephen Ho, et al. Applied Physics A 106(1)

SUMMARY OF INVENTION

An optical connection component according to the present disclosure includes three or more cores that transmit optical signals along a first direction. The optical connection component includes a first surface extending in a second direction intersecting the first direction and in a third direction intersecting both the first direction and the second direction; and a second surface extending in the second direction and the third direction and arranged with the first surface along the first direction. Each of the cores extends from the first surface to the second surface along the first direction. The three or more cores are disposed not to be arranged on one straight line on each of the first surface and the second surface. A core disposition on the first surface defined by the three or more cores is different from a core disposition on the second surface defined by the three or more cores.

DESCRIPTION OF EMBODIMENTS

Figure 1:
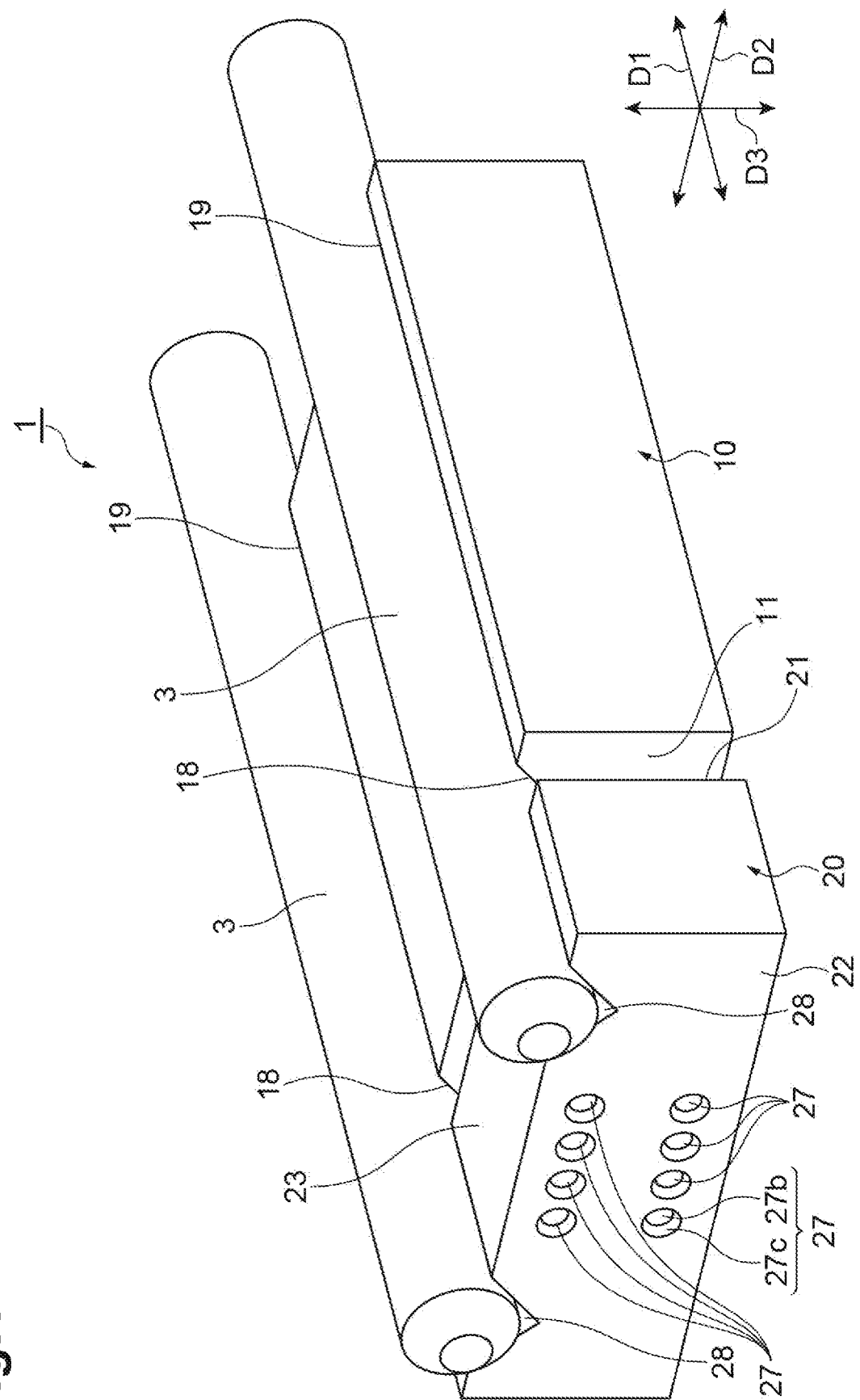
FIG. 1 is a perspective view showing an optical connection structure including an optical connection component according to a first embodiment.

The optical waveguide includes the core that transmits an optical signal. As in the optical waveguide of the related art, in a case where a plurality of cores that transmit optical signals to a plurality of respective single-core fibers arranged in a row are provided, when the number of the single-core fibers is increased, the region occupied by the cores may increase, and the space utilization efficiency may decrease.

An object of the present disclosure is to provide an optical connection component and an optical connection structure capable of suppressing a decrease in the space utilization efficiency.

DESCRIPTION OF EMBODIMENTS OF PRESENT DISCLOSURE

Initially, embodiments of the present disclosure will be listed and described. (1) An optical connection component according to one embodiment includes three or more cores that transmit optical signals along a first direction. The optical connection component includes a first surface extending in a second direction intersecting the first direction and in a third direction intersecting both the first direction and the second direction; and a second surface extending in the second direction and the third direction and arranged with the first surface along the first direction. Each of the cores extends from the first surface to the second surface along the first direction. The three or more cores are disposed not to be arranged on one straight line on each of the first surface and the second surface. A core disposition on the first surface defined by the three or more cores is different from a core disposition on the second surface defined by the three or more cores.

In the optical connection component according to one embodiment, the three or more cores are disposed not to be arranged on one straight line on each of the first surface and the second surface. Namely, the shape formed by the three or more cores on each of the first surface and the second surface is a shape other than a straight line. Therefore, since the cores are two-dimensionally disposed on each of the first surface and the second surface, even when the number of the single-core fibers to be connected is increased, an increase in the region occupied by the cores can be suppressed. Therefore, a decrease in space utilization efficiency can be suppressed.

A single-core fiber array that holds a plurality of single-core fibers may be connected to the first surface, and a multicore fiber array may be connected to the second surface. In this case, the single-core fibers of the single-core fiber array can be optically connected to the respective cores on the first surface, and cores of the multicore fiber can be optically connected to the respective cores on the second surface.

(2) In (1) described above, the optical connection component may further include a first positioning portion that positions a single-core fiber array that holds a plurality of single-core fibers. In this case, the single-core fiber array is positioned with respect to the optical connection component by the first positioning portion. Therefore, the positioning of the single-core fiber array with respect to the optical connection component can be easily performed.

(3) In (2) described above, the first positioning portion may be a V-groove on a third surface connecting the first surface and the second surface. (4) In (2) described above, the first positioning portion may be a pin hole penetrating from the first surface to the second surface.

(5) In (1) or (2) described above, the optical connection component may further include a second positioning portion that positions a multicore fiber array that holds a multicore fiber. In this case, the multicore fiber is positioned with respect to the optical connection component by the second positioning portion. Therefore, the positioning of the multicore fiber with respect to the optical connection component can be easily performed.

(6) In (5) described above, the second positioning portion may be a V-groove on a third surface connecting the first surface and the second surface. (7) In (5) described above, the second positioning portion may be a pin hole penetrating from the first surface to the second surface.

(8) In any one of (1) to (7) described above, a single-core fiber array that holds a plurality of single-core fibers may be connected to the first surface, and a multicore fiber array that holds a multicore fiber may be connected to the second surface.

(9) In (8) described above, the single-core fiber array and the multicore fiber array may be made of polyphenylene sulfide. In this case, the single-core fiber array and the multicore fiber array can be molded by injection molding. Therefore, the single-core fiber array and the multicore fiber array can be easily fabricated.

(10) In (8) described above, the single-core fiber array and the multicore fiber array may be made of glass. In this case, when either the optical connection component or optical fibers to be connected are made of a glass material, a difference in the coefficient of linear expansion from a glass component can be eliminated.

(11) In (1) described above, the optical connection component may further include a single-core fiber holding portion that holds a plurality of single-core fibers optically connected to the respective cores disposed on the first surface. In this case, the single-core fiber holding portion of the optical connection component can hold the plurality of single-core fibers. Therefore, the need to separately prepare a component that holds the plurality of single-core fibers can be eliminated.

(12) In (11) described above, the single-core fiber holding portion may be open toward the first surface, and may have a plurality of holes corresponding to the plurality of single-core fibers.

(13) In (11) or (12) described above, the optical connection component may include a gap between the single-core fiber holding portion and the first surface. In this case, air bubbles or the like from an adhesive for bonding the single-core fibers to the single-core fiber holding portion can escape from the gap.

(14) An optical connection structure according to the present disclosure connects a plurality of single-core fibers and one or a plurality of multicore fibers via an optical connection component. The optical connection component includes three or more cores that transmit optical signals along a first direction, a first surface extending in a second direction intersecting the first direction and in a third direction intersecting both the first direction and the second direction, and a second surface extending in the second direction and the third direction and arranged with the first surface along the first direction. Each of the cores extends from the first surface to the second surface along the first direction. The three or more cores are disposed not to be arranged on one straight line on each of the first surface and the second surface. A core disposition on the first surface defined by the three or more cores is different from a core disposition on the second surface defined by the three or more cores. The plurality of single-core fibers are connected to the first surface, and the one or plurality of multicore fibers are connected to the second surface. The same effects as those of the optical connection component described above can be obtained from the optical connection structure.

DETAILS OF EMBODIMENTS OF PRESENT DISCLOSURE

Specific examples of an optical connection component and an optical connection structure according to the present disclosure will be described below with reference to the drawings. Incidentally, it is intended that the present invention is not limited to the following examples and includes all changes implied by the claims and within the scope equivalent to the claims. In the description of the drawings, the same or equivalent elements are denoted by the same reference signs, and duplicate descriptions will be omitted as appropriate. In addition, the drawings may be partially depicted in a simplified or exaggerated manner for ease of understanding, and dimensional ratios and the like are not limited to those shown in the drawings.

First Embodiment

FIG. 1 is a perspective view showing an optical connection structure 1 including an optical connection component 10 according to a first embodiment. As shown in FIG. 1, the optical connection structure 1 includes, for example, the optical connection component 10, a single-core fiber array 20, and guide pins 3. The optical connection component 10 transmits optical signals along a first direction D1. The optical connection component 10 and the single-core fiber array 20 are arranged along the first direction D1. The guide pins 3 are provided for positioning the single-core fiber array 20 with respect to the optical connection component 10.

Figure 2:
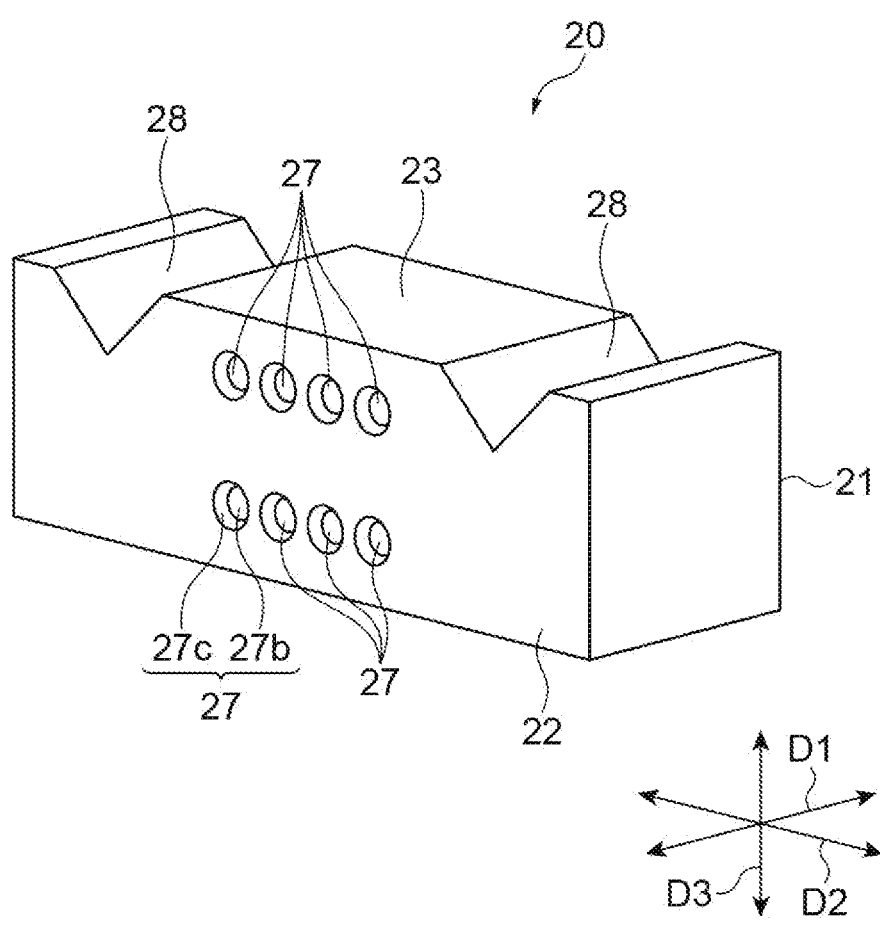
FIG. 2 is a perspective view showing a single-core fiber array connected to the optical connection component according to the first embodiment.

FIG. 2 is a perspective view showing the single-core fiber array 20. As shown in FIGS. 1 and 2, the single-core fiber array 20 has a first surface 21 facing the optical connection component 10; a second surface 22 facing away from the first surface 21; and a third surface 23. The third surface 23 connects the first surface 21 and the second surface 22 to each other, and extends in the first direction D1 and a second direction D2 intersecting (for example, orthogonal to) the first direction D1. The third surface 23 is oriented in a third direction D3 intersecting (for example, orthogonal to) both the first direction D1 and the second direction D2.

For example, the single-core fiber array 20 is made of Poly Phenylene sulfide (PPS). However, the single-core fiber array 20 may be made of glass. The single-core fiber array 20 has optical fiber holding holes 27 into which single-core fibers are inserted. The optical fiber holding holes 27 penetrate through the single-core fiber array 20 in the first direction D1 between the first surface 21 and the second surface 22.

The single-core fiber array 20 has a plurality of the optical fiber holding holes 27. Each of the optical fiber holding holes 27 is open on the second surface 22. For example, the optical fiber holding hole 27 is defined by an inner surface 27b extending along the first direction D1 and an inclined surface 27c that is increased in diameter from the inner surface 27b toward the second surface 22. For example, the plurality of optical fiber holding holes 27 are arranged along the second direction D2, and are arranged along the third direction D3. As one example, four optical fiber holding holes 27 are arranged along the second direction D2, and two optical fiber holding holes 27 are arranged along the third direction D3.

The single-core fiber array 20 includes positioning portions 28 on which the guide pins 3 are placed. The positioning portions 28 are, for example, V-grooves extending along the first direction D1. The single-core fiber array 20 includes two positioning portions 28 arranged along the second direction D2. The guide pin 3 is placed on each of the two positioning portions 28. The single-core fiber array 20 is aligned with respect to the optical connection component 10 by the guide pins 3 placed on the positioning portions 28.

Figure 3:
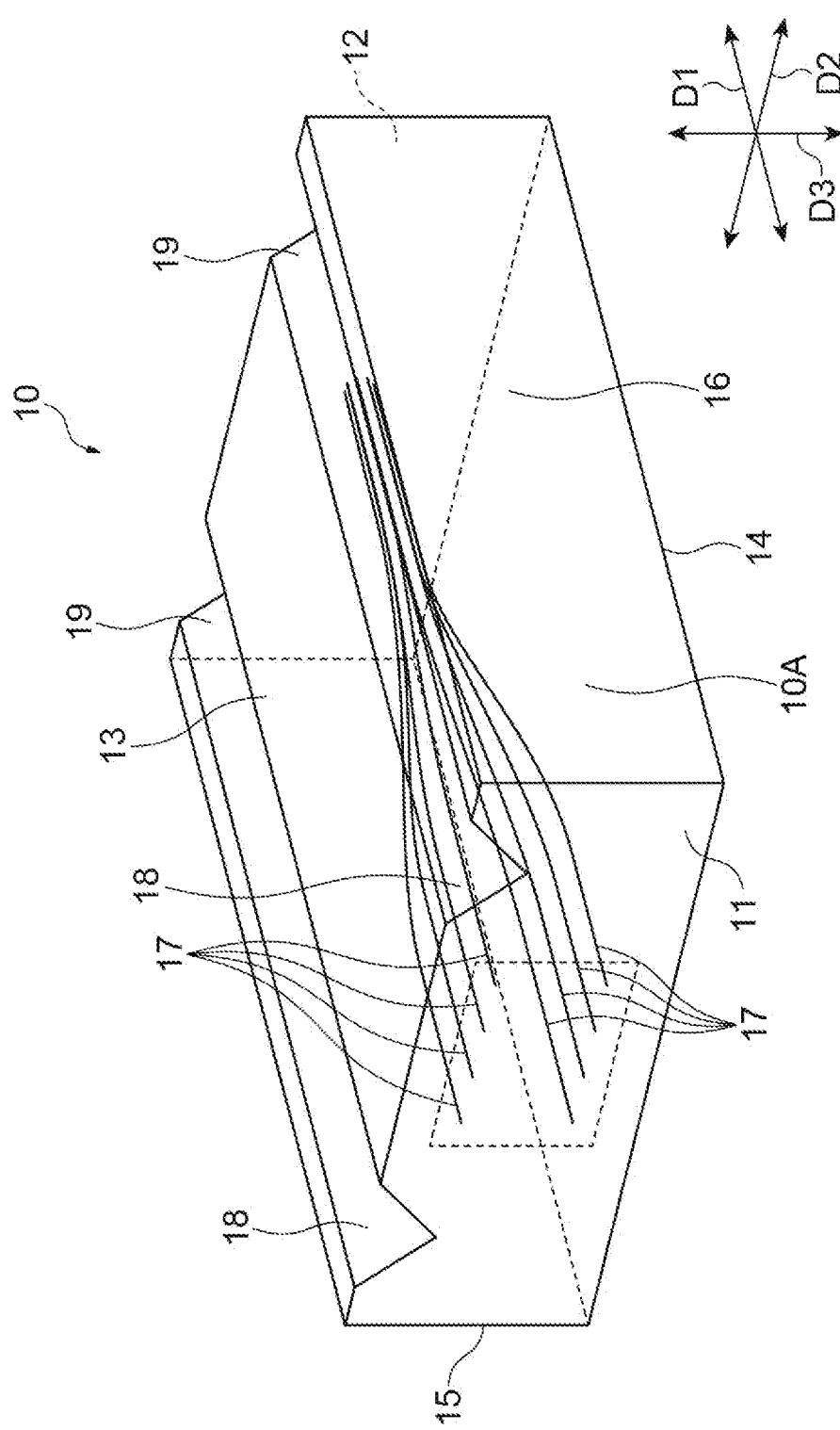
FIG. 3 is a perspective view showing the optical connection component according to the first embodiment.

FIG. 3 is a perspective view showing the optical connection component 10. The optical connection component 10 has a first surface 11 facing the single-core fiber array 20 along the first direction D1, and a second surface 12 facing away from the first surface 11. The first surface 11 and the second surface 12 are arranged along the first direction D1. Each of the first surface 11 and the second surface 12 extends in the second direction D2 and the third direction D3. The optical connection component 10 has a third surface 13, a fourth surface 14, a fifth surface 15, and a sixth surface 16 in addition to the first surface 11 and the second surface 12. The third surface 13 extends in the first direction D1 and the second direction D2, and the fourth surface faces away from the third surface 13. The fifth surface 15 extends in the first direction D1 and the third direction D3, and the sixth surface 16 faces away from the fifth surface 15.

The optical connection component 10 includes a clad 10A and cores 17 disposed inside the clad 10A and transmitting optical signals along the first direction D1. The cores 17 are fabricated, for example, by irradiation with a femtosecond laser. In the optical connection component 10, three or more (eight in the present embodiment) cores 17 are disposed inside the integral clad 10A. Each of a plurality of the cores 17 extends along the first direction D1, and is bent in the second direction D2 and the third direction D3. The optical connection component 10 has a three-dimensional optical waveguide that transmits optical signals in the cores 17 while being bent in the first direction D1, the second direction D2, and the third direction D3.

Each of the cores 17 extends from the first surface 11 to the second surface 12 along the first direction D1. For example, each of the cores 17 is exposed on each of the first surface 11 and the second surface 12. The cores 17 exposed on the first surface 11 are optically connected to the respective single-core fibers inserted into the optical fiber holding holes 27 of the single-core fiber array 20. For example, the plurality of cores 17 exposed on the second surface 12 are optically connected to a multicore fiber.

Figure 4:
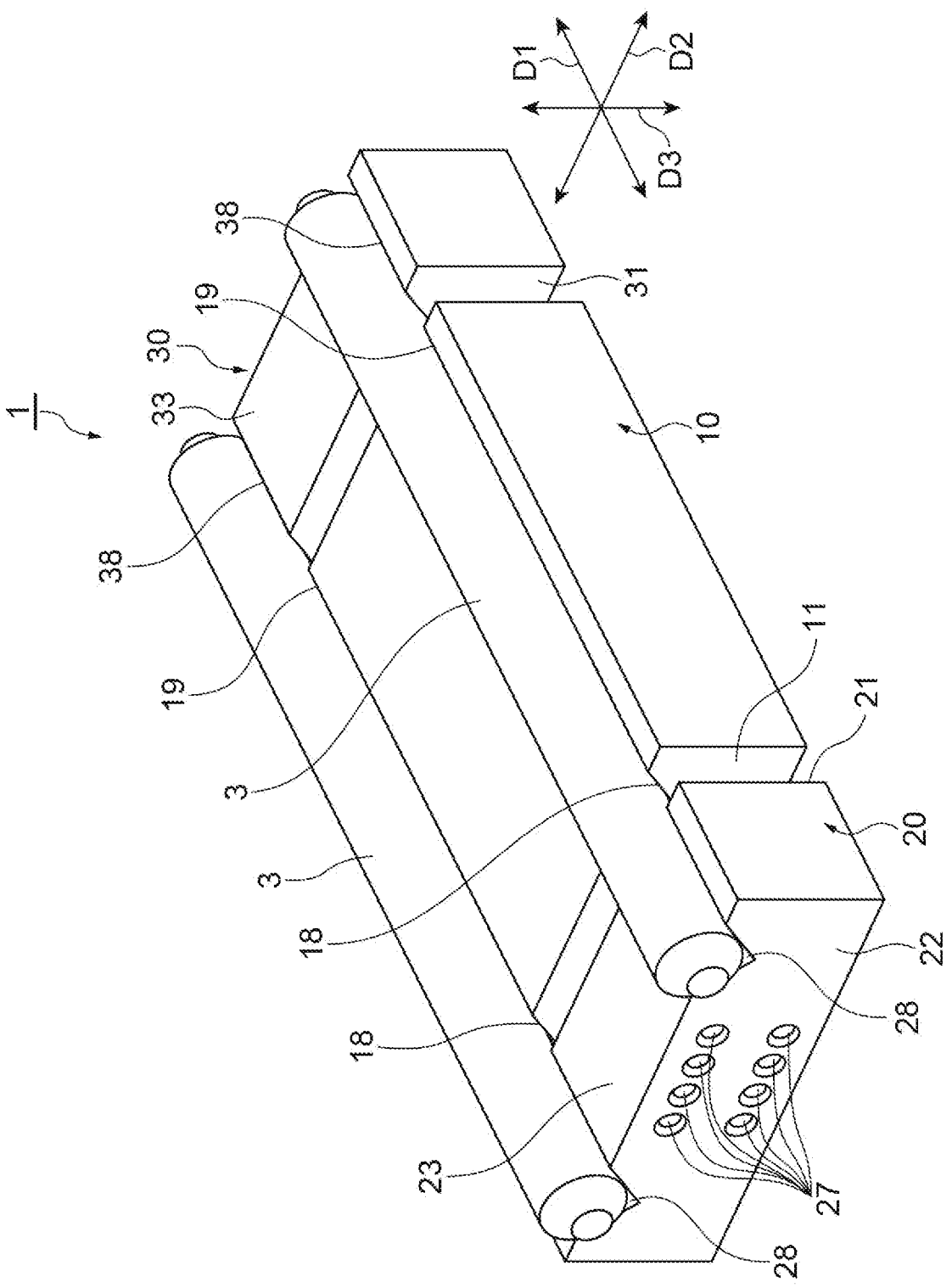
FIG. 4 is a perspective view showing a state where a multicore fiber array is connected to the optical connection component of FIG. 3.
Figure 5:
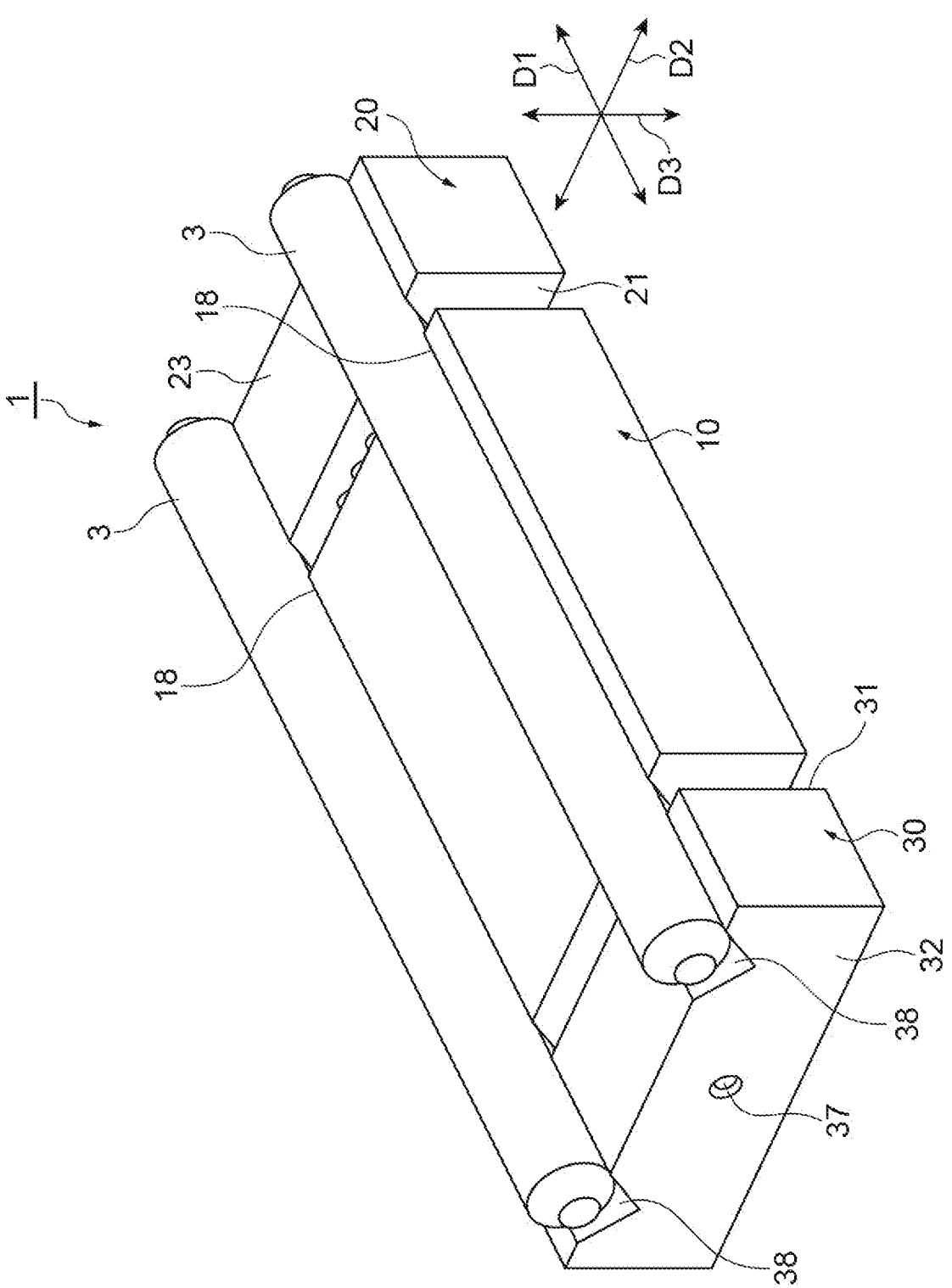
FIG. 5 is a perspective view of the optical connection component of FIG. 4 when viewed in a direction different from that in FIG. 4.

As shown in FIGS. 1 and 3, the single-core fiber array 20 holding a plurality of the single-core fibers are connected to the first surface 11. For example, one or a plurality of multicore fibers are connected to the second surface 12. As shown in FIGS. 4 and 5, a multicore fiber array 30 holding one or a plurality of multicore fibers may be connected to the second surface 12. Similarly to the single-core fiber array 20, the multicore fiber array 30 has a first surface 31; a second surface 32 facing away from the first surface 31; and a third surface 33 connecting the first surface 31 and the second surface 32 to each other. The multicore fiber array 30 includes an optical fiber holding hole 37 that is open on the second surface 32, and positioning portions 38 on which the guide pins 3 are placed. Similarly to the positioning portions 28 described above, the positioning portions 38 are V-grooves. The plurality of cores 17 exposed on the second surface 12 are optically connected to the multicore fiber held in the optical fiber holding hole 37 of the multicore fiber array 30.

The optical connection component 10 includes first positioning portions 18 that position the single-core fiber array 20. The first positioning portions 18 are, for example, V-grooves extending along the first direction D1. The optical connection component 10 includes two first positioning portions 18 arranged along the second direction D2. The guide pin 3 is placed on each of the two first positioning portions 18. The first positioning portion 18 is provided on an extension of the corresponding positioning portion 28 of the single-core fiber array 20. Namely, the first positioning portion 18 and the corresponding positioning portion 28 are disposed on a straight line. Therefore, the single-core fiber array 20 can be aligned with respect to the optical connection component 10 by placing the guide pins 3 on the first positioning portions 18 and the positioning portions 28. The first positioning portions 18 are formed, for example, by selectively performing etching through irradiation with a laser. In this case, the first positioning portions 18 can be formed in the same process as the fabrication of the cores 17.

The optical connection component 10 may include second positioning portions 19 that position the multicore fiber connected to the second surface 12. For example, the second positioning portion 19 is provided on an extension of the corresponding first positioning portion 18. FIGS. 1 and 3 show an example in which the first positioning portion 18 and the corresponding second positioning portion 19 are disposed on a straight line. For example, similar to the single-core fiber array 20, the multicore fiber array 30 is connected to the second surface 12, and the guide pins 3 are placed on the second positioning portions 19 and the positioning portions 38 of the multicore fiber array 30. Accordingly, the multicore fiber array can be aligned with respect to the optical connection component 10.

Figure 6:
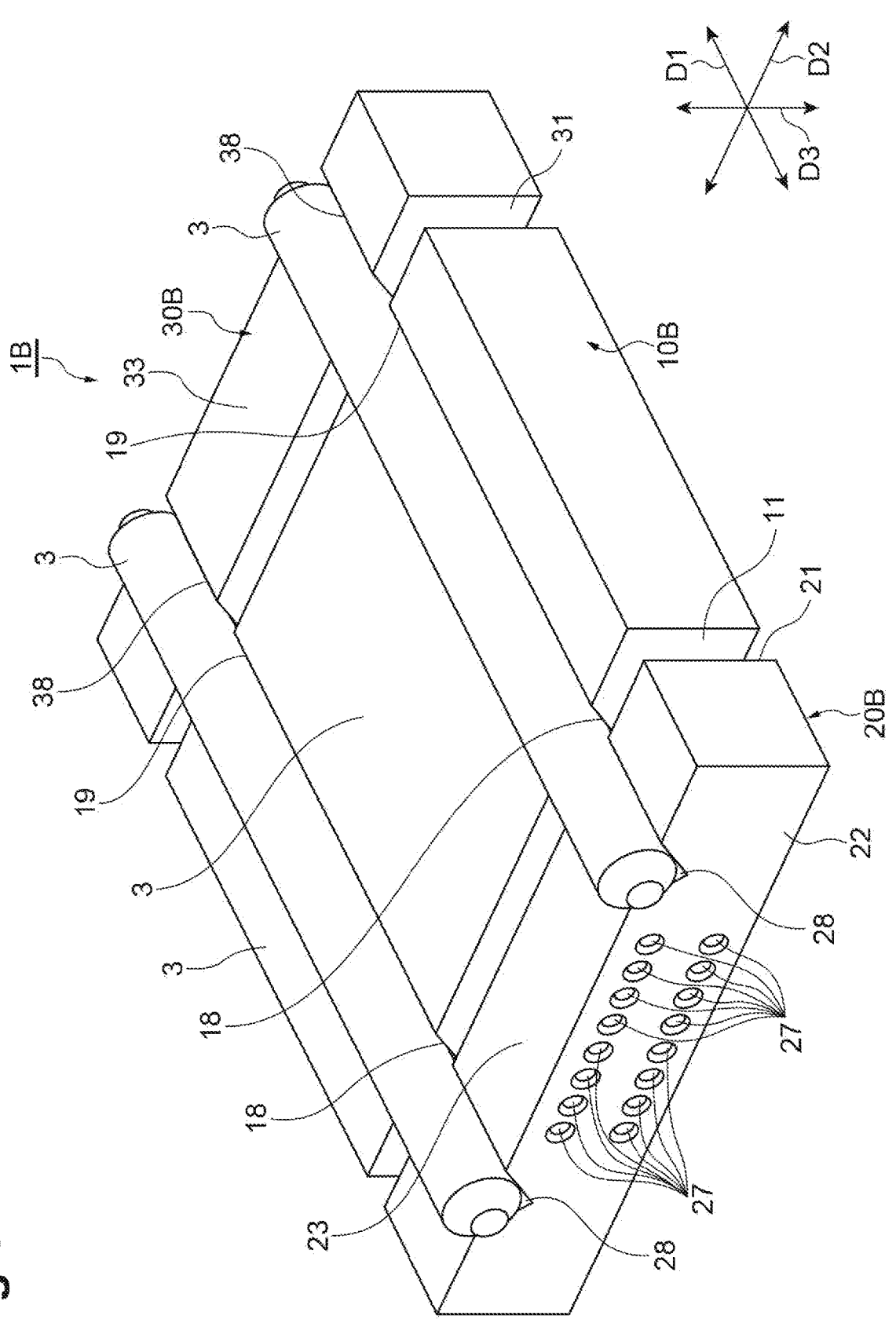
FIG. 6 is a perspective view showing an optical connection component when a multicore fiber has two cores.
Figure 7:
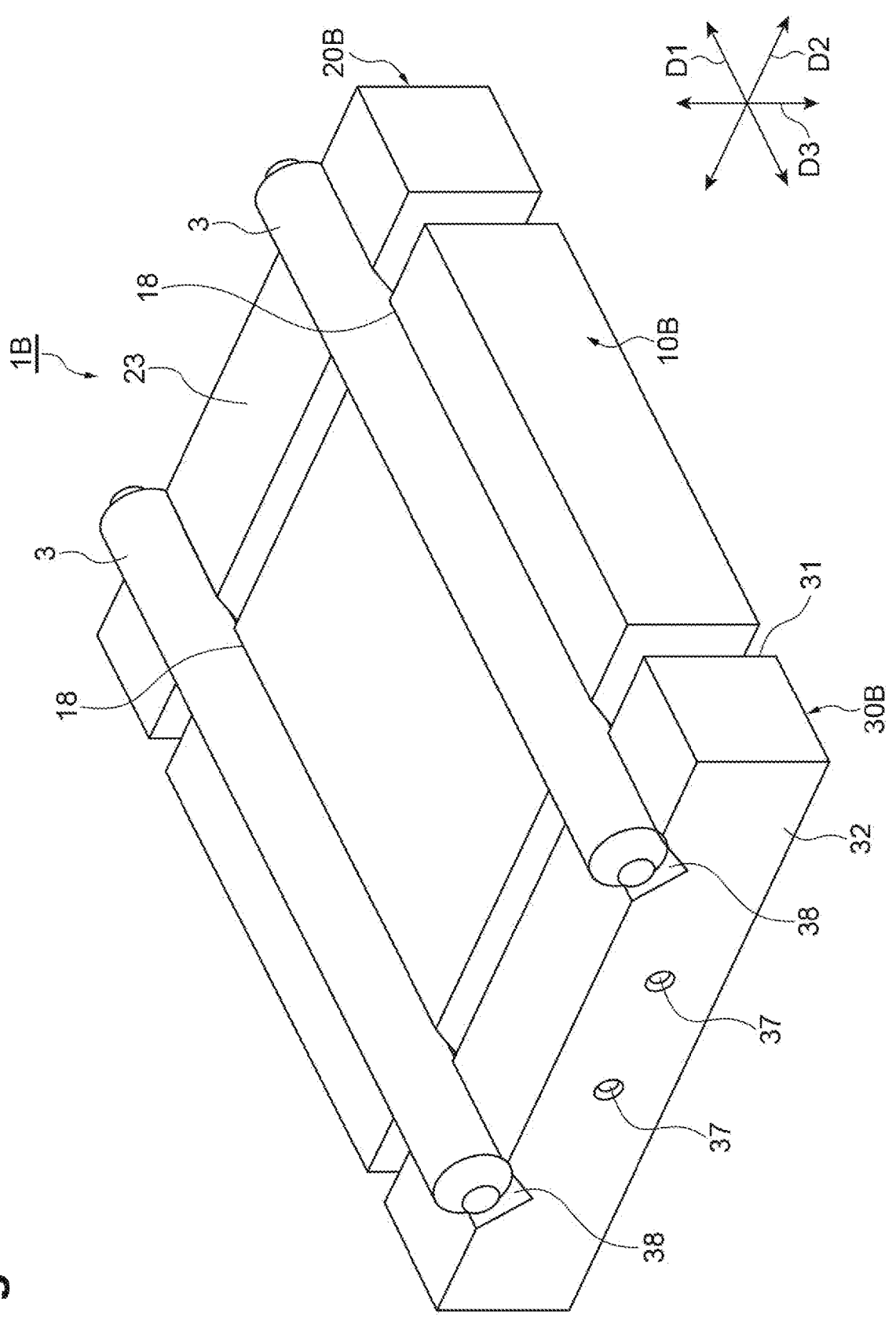
FIG. 7 is a perspective view of the optical connection component of FIG. 6 when viewed in a direction different from that in FIG. 6.

FIG. 6 is a perspective view showing an optical connection structure 1B as one example in which the numbers of the optical fiber holding holes 27 and 37 are different from those in FIGS. 4 and 5. FIG. 7 is a perspective view of the optical connection structure 1B of FIG. 6 when viewed in a direction different from that in FIG. 6. As shown in FIGS. 6 and 7, the optical connection structure 1B includes an optical connection component 10B, a single-core fiber array 20B, and a multicore fiber array 30B. The single-core fiber array 20B has 16 (2×8) optical fiber holding holes 27 on the second surface 22, and the multicore fiber array 30B has two optical fiber holding holes 37 on the second surface 32. The configurations of the optical connection component 10B, the single-core fiber array 20B, and the multicore fiber array 30B are the same as the configurations of the optical connection component 10, the single-core fiber array 20, and the multicore fiber array 30 described above except for the numbers and disposition modes of the optical fiber holding holes 27 and 37.

Figure 8:
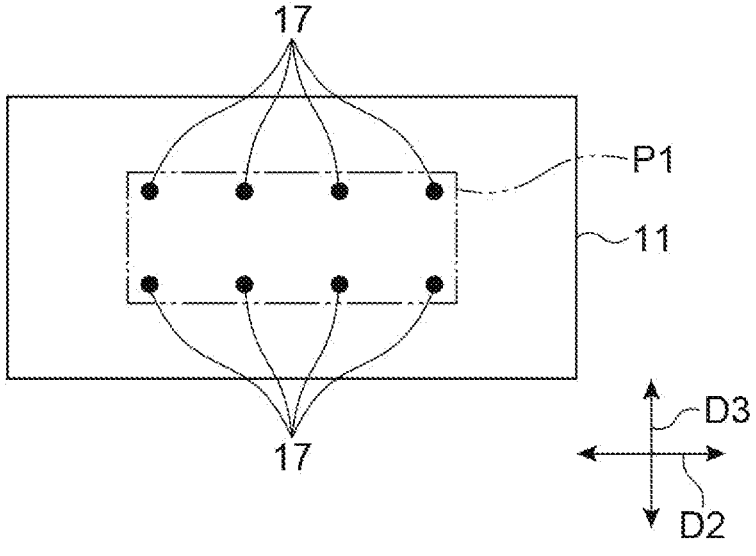
FIG. 8 is a view showing an example of core disposition on a first surface and a second surface according to the first embodiment.
Figure 8:
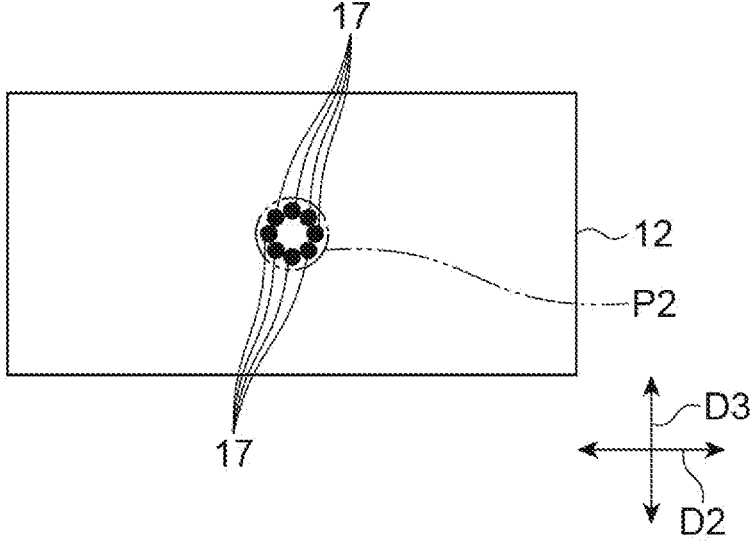

FIG. 8 shows an example of disposition of the cores 17 on each of the first surface 11 and the second surface 12 of the optical connection component 10 shown in FIG. 3. As shown in FIG. 8, three or more cores 17 are disposed not to be arranged on one straight line on each of the first surface 11 and the second surface 12. In the example of FIG. 8, the disposition of eight cores 17 on the first surface 11 is a rectangular shape (two along the third direction D3×four along the second direction D2), and the disposition of the eight cores 17 on the second surface 12 is a circular shape. However, the number and disposition of the cores 17 are not limited to the example of FIG. 8.

As described above, a core disposition P1 on the first surface 11 defined by the three or more cores 17 is different from a core disposition P2 on the second surface 12 defined by the three or more cores 17. The term "core disposition" indicates the shape and size of a plurality of cores, which are defined by the plurality of cores. In the example of FIG. 8, the core disposition P1 is a rectangular shape, and the core disposition P2 is a circular shape. In such a manner, the shape of the core disposition P1 is different from the shape of the core disposition P2.

Figure 9:
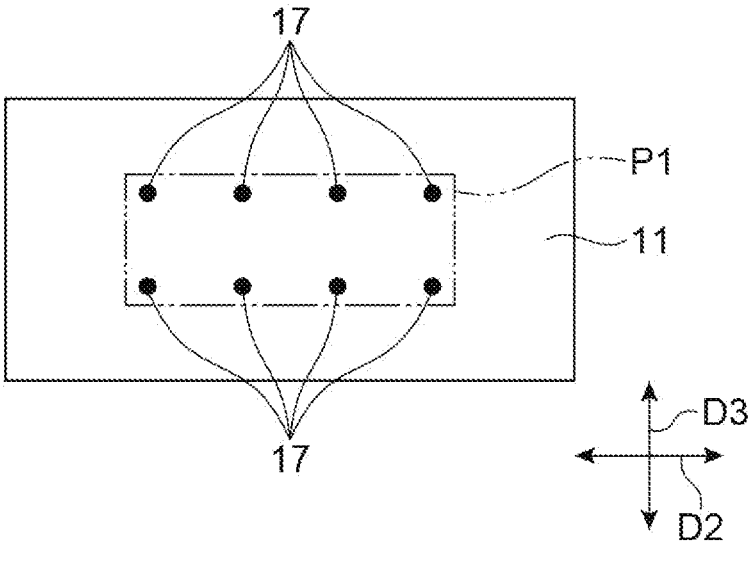
FIG. 9 is a view showing a core disposition on the first surface and the second surface according to a modification example.
Figure 9:
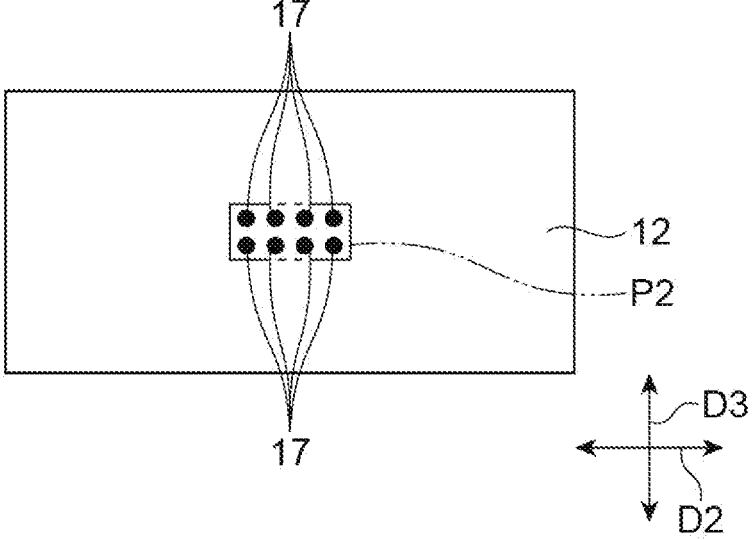

The term "core dispositions being different from each other" also includes, for example, a case where the shapes of the core dispositions are the same but the sizes of the core dispositions are different. For example, as shown in FIG. 9, a case where the core disposition P1 is a rectangular shape and the core disposition P2 is similar in shape to the core disposition P1 is also included in the case of "core dispositions being different from each other". As described above, in the present embodiment, at least one of the shape and size of the core disposition P1 is different from at least one of the shape and size of the core disposition P2.

In the optical connection component 10 described above, the three or more cores 17 are disposed not to be arranged on one straight line on each of the first surface 11 and the second surface 12. Therefore, since the cores 17 are two-dimensionally disposed on each of the first surface 11 and the second surface 12, even when the number of the single-core fibers of the single-core fiber array 20 to be connected is increased, an increase in the region occupied by the cores 17 can be suppressed. In the present embodiment, the region occupied by the cores 17 can be prevented from being too much widened in the second direction D2. Therefore, a decrease in space utilization efficiency can be suppressed.

Second Embodiment

Figure 10:
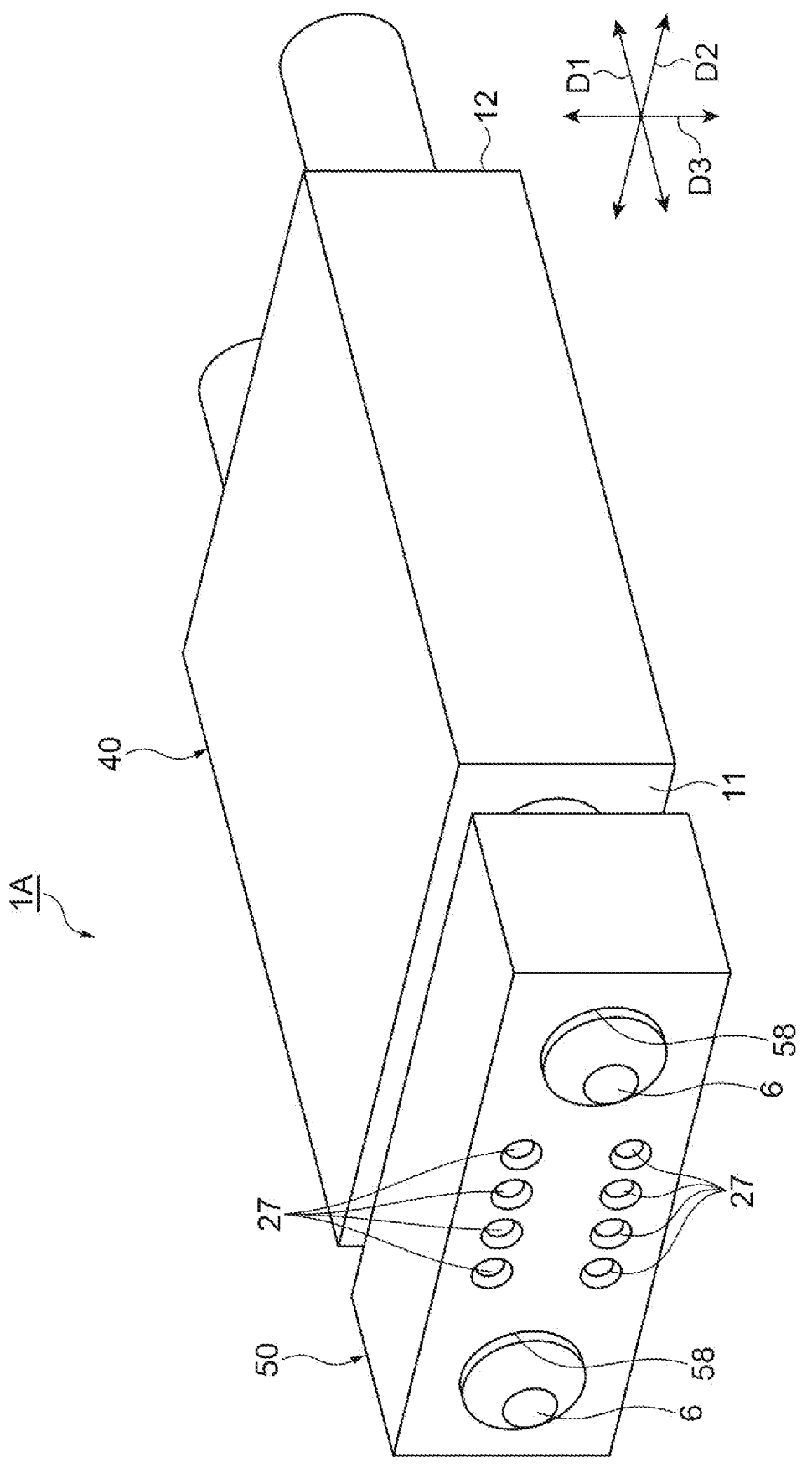
FIG. 10 is a perspective view showing an optical connection structure according to a second embodiment.
Figure 11:
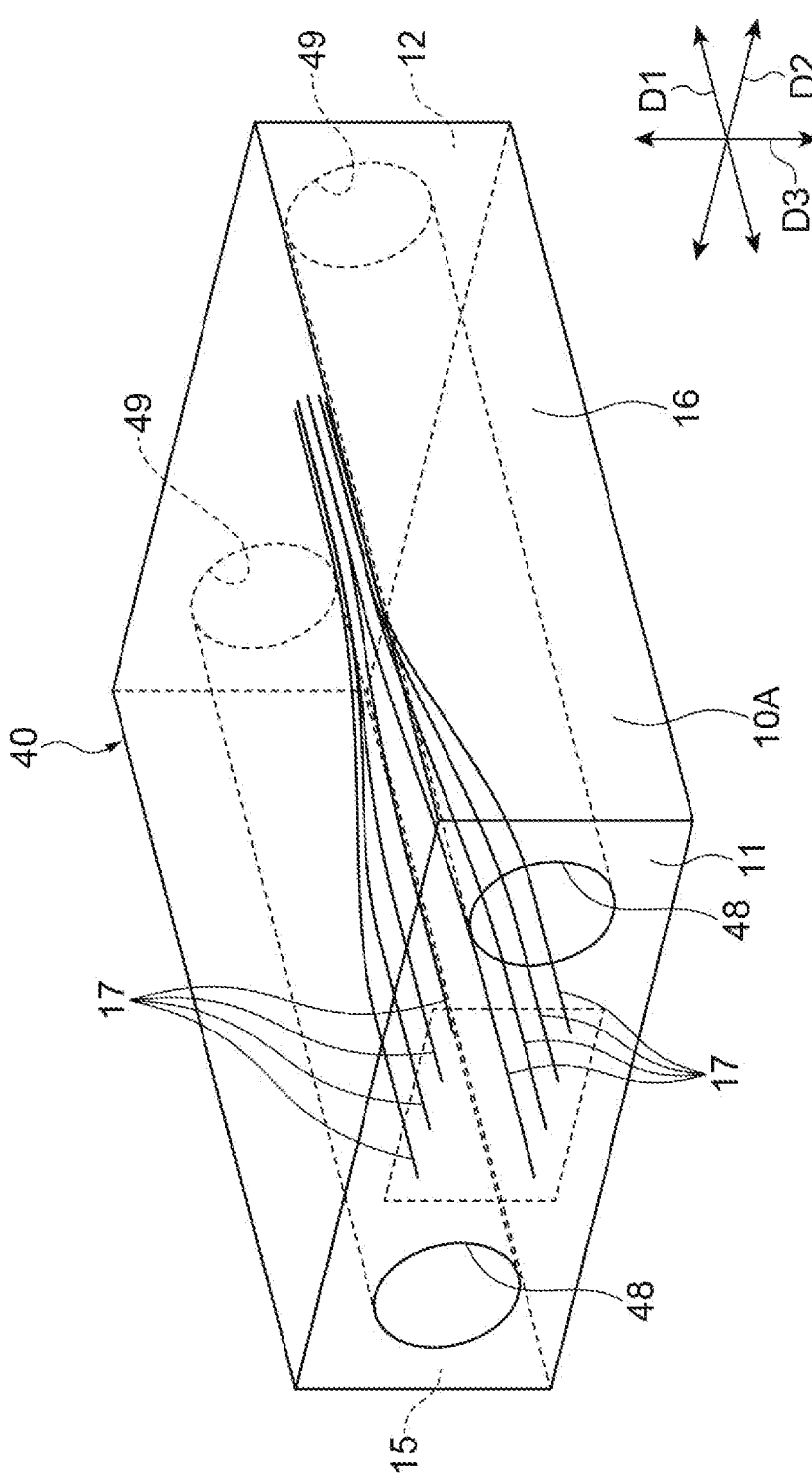
FIG. 11 is a perspective view showing the optical connection component according to the second embodiment.

Next, an optical connection component 40 according to a second embodiment will be described with reference to FIGS. 10 and 11. FIG. 10 is a perspective view showing an optical connection structure 1A including the optical connection component 40. FIG. 11 is a perspective view showing the optical connection component 40. Since a part of a configuration of the optical connection structure 1A overlaps with a part of the configuration of the optical connection structure 1 described above, portions overlapping with the configuration of the optical connection structure 1 are denoted by the same reference signs, and descriptions thereof will be omitted as appropriate.

As shown in FIGS. 10 and 11, the optical connection structure 1A includes the optical connection component 40, a single-core fiber array 50, and guide pins 6. The single-core fiber array 50 includes positioning portions 58 through which the guide pins 6 are passed. The positioning portions 58 are, for example, guide holes penetrating through the single-core fiber array 50 along the first direction D1. The single-core fiber array 50 includes two positioning portions 58 arranged along the second direction D2, and the guide pin 6 is inserted into each of the two positioning portions 58.

The optical connection component 40 includes first positioning portions 48 that position the single-core fiber array 50. The first positioning portions 48 are, for example, guide holes of the optical connection component 40 extending along the first direction D1. The first positioning portions 48 may be, for example, pin holes penetrating from the first surface 11 to the second surface 12. The optical connection component 40 includes two first positioning portions 48 arranged along the second direction D2, and the guide pin 6 is passed through each of the two first positioning portions 48. The first positioning portion 48 is provided on an extension of the corresponding positioning portion 58 of the single-core fiber array 50. Therefore, the single-core fiber array 50 can be aligned with respect to the optical connection component 40 by passing the guide pins 6 through the first positioning portions 48 and the positioning portions 58.

The optical connection component 40 may include second positioning portions 49 that position the multicore fiber connected to the second surface 12. The second positioning portions 49 may be, for example, pin holes penetrating from the first surface 11 to the second surface 12. For example, the second positioning portion 49 is provided on an extension of the corresponding first positioning portion 48. For example, similar to the single-core fiber array 50, a multicore fiber array is connected to the second surface 12, and the guide pins 6 are passed through the second positioning portions 49 and positioning portions of the multicore fiber array. Accordingly, the multicore fiber array can be aligned with respect to the optical connection component 40.

Third Embodiment

Figure 12:
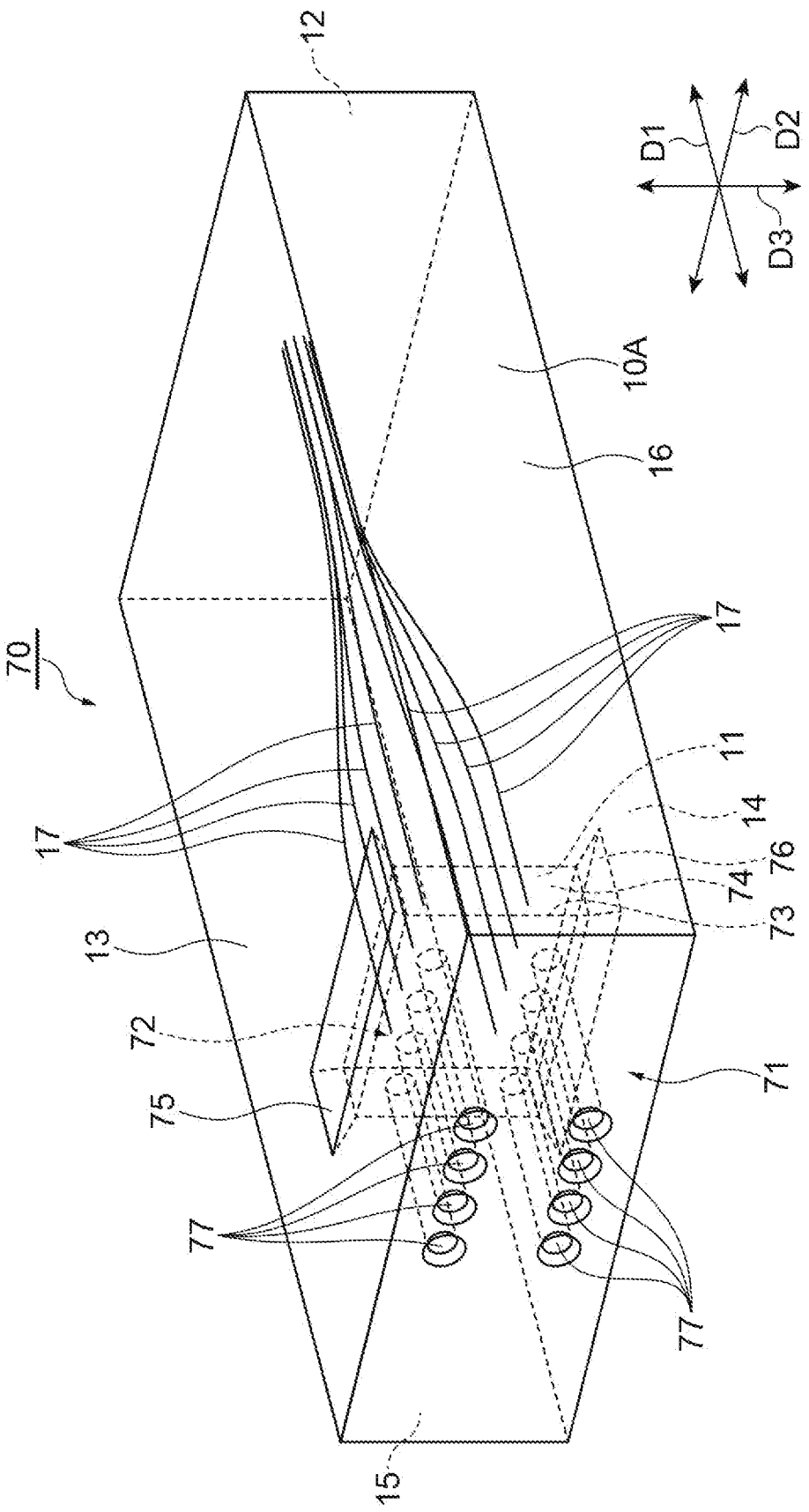
FIG. 12 is a perspective view showing an optical connection component according to a third embodiment.

FIG. 12 is a perspective view showing an optical connection component 70 according to a third embodiment. The optical connection component 70 shown in FIG. 12 includes a single-core fiber holding portion 71 at a position facing the first surface 11 on which the cores 17 are exposed. The single-core fiber holding portion 71 holds a plurality of single-core fibers that are optically connected to the respective cores 17 disposed on the first surface 11. The single-core fiber holding portion 71 has optical fiber holding holes 77 that hold the single-core fibers.

The shape and size of the optical fiber holding holes 77 are, for example, the same as the shape and size of the optical fiber holding holes 27 of the single-core fiber array 20 described above. For example, the single-core fiber holding portion 71 has a function of holding a plurality of single-core fibers similarly to the single-core fiber arrays 20 and 50 described above, and is integrated with the clad 10A.

Therefore, there is no need to prepare the single-core fiber arrays 20 and 50 separately from the optical connection component 70.

A gap 72 is formed between the single-core fiber holding portion 71 and the first surface 11. The gap 72 is provided to release air bubbles in an adhesive for fixing the single-core fibers to the optical fiber holding holes 77. The gap 72 is formed between the optical fiber holding holes 77 of the single-core fiber holding portion 71 and the cores 17 on the first surface 11. For example, the gap 72 penetrates through the optical connection component 70 in the third direction D3, and is open on the third surface 13 and the fourth surface 14.

As one example, the gap 72 is defined by the first surface 11, a first inner surface 73 facing the first surface 11, a pair of second inner surfaces 74 arranged along the second direction D2, a first inclined surface 75, and a second inclined surface 76. The optical fiber holding holes 77 are open on the first inner surface 73. The first inclined surface 75 is inclined to widen toward the third surface 13. The second inclined surface 76 is inclined to widen toward the fourth surface 14.

As described above, in the optical connection component 70, air bubbles generated from the adhesive entering gaps between inner surfaces of the optical fiber holding holes 77 and the single-core fibers escape to the outside of the optical connection component 70 through the gap 72. Therefore, the air bubbles can escape to the outside of the optical connection component 70. In the third embodiment, the example in which the gap 72 is defined by the first inner surface 11, the first inner surface 73, the pair of second inner surfaces 74, the first inclined surface 75, and the second inclined surface 76 has been described. However, the shape of the gap formed between the single-core fiber holding portion 71 and the first surface 11 is not limited to the above-described example, and can be changed as appropriate.

Each of the embodiments has been described above. The present disclosure is not limited to the above-described embodiments, and various changes can be made without departing from the concept described in each claim. For example, the number and disposition mode of the cores in the optical connection component and the optical connection structure can be further changed without departing the above-described concept. For example, in the above-described embodiments, the example in which the first positioning portion 18 that performs the positioning of the single-core fiber array 20 and the corresponding second positioning portion 19 that performs the positioning of the multicore fiber array are disposed on a straight line has been described. However, the first positioning portion and the corresponding second positioning portion may not be disposed on a straight line, and for example, may be separately provided at different positions.

In the above-described embodiments, as shown in FIG. 12, the optical connection component 70 including the single-core fiber holding portion 71 has been described. Similarly to the single-core fiber holding portion 71, the optical connection component may include a multicore fiber holding portion. For example, the multicore fiber holding portion is provided at a position facing a second surface (similarly to the first surface 11, a surface located inside the second surface 12 in the first direction D1) on which the cores 17 are exposed, and holds one or a plurality of multicore fibers that are optically connected to the respective cores 17 disposed on the second surface. The multicore fiber holding portion has optical fiber holding holes that hold the multicore fibers. The shape and size of the optical fiber holding holes are, for example, the same as the shape and size of the optical fiber holding holes 37 of the multicore fiber array 30 or the multicore fiber array 30B described above. For example, the multicore fiber holding portion has a function of holding one or a plurality of multicore fibers similarly to the multicore fiber arrays 30 and 30B described above, and is integrated with the clad 10A. In this case, there is no need to prepare the multicore fiber arrays 30 and 30B separately from the optical connection component 70. Further, the same gap as the gap 72 may be formed between the multicore fiber holding portion and the second surface. In this case, the same effects as those of the optical connection component 70 described above can be obtained.

REFERENCE SIGNS LIST 1, 1A, 1B: optical connection structure, 3, 6: guide pin, 10, 10B, 40, 70: optical connection component, 10A: clad, 11: first surface, 12: second surface, 13: third surface, 14: fourth surface, 15: fifth surface, 16: sixth surface, 17: core, 18, 48: first positioning portion, 19, 49: second positioning portion, 20, 20B, 50: single-core fiber array, 21: first surface, 22: second surface, 23: third surface, 27: optical fiber holding hole, 27*b*: inner surface, 27*c*: inclined surface, 28, 58: positioning portion, 30, 30B: multicore fiber array, 31: first surface, 32: second surface, 33: third surface, 37: optical fiber holding hole, 38: positioning portion, 71: single-core fiber holding portion, 72: gap, 73: first inner surface, 74: second inner surface, 75: first inclined surface, 76: second inclined surface, 77: optical fiber holding hole, D1: first direction, D2: second direction, D3: third direction, P1, P2: core disposition.

The invention claimed is:

1. An optical connection component comprising:
three or more cores that transmit optical signals along a first direction;
a first surface extending in a second direction intersecting the first direction and in a third direction intersecting both the first direction and the second direction; and
a second surface extending in the second direction and the third direction and arranged with the first surface along the first direction,
wherein each of the cores extends from the first surface to the second surface along the first direction,
the three or more cores are disposed not to be arranged on one straight line on each of the first surface and the second surface, and
a core disposition on the first surface defined by the three or more cores is different from a core disposition on the second surface defined by the three or more cores,
wherein a single-core fiber array that holds a plurality of single-core fibers is connected to the first surface, and a multicore fiber array that holds a multicore fiber is connected to the second surface.

2. The optical connection component according to claim 1, further comprising:
a first positioning portion that positions the single-core fiber array that holds the plurality of single-core fibers.

3. The optical connection component according to claim 2,
wherein the first positioning portion is a V-groove on a third surface connecting the first surface and the second surface.

4. The optical connection component according to claim 2, wherein the first positioning portion is a pin hole penetrating from the first surface to the second surface.

5. The optical connection component according to claim 1, further comprising:

a second positioning portion that positions the multicore fiber array that holds the multicore fiber.

6. The optical connection component according to claim 5, wherein the second positioning portion is a V-groove on a third surface connecting the first surface and the second surface.

7. The optical connection component according to claim 5, wherein the second positioning portion is a pin hole penetrating from the first surface to the second surface.

8. The optical connection component according to claim 1, wherein the single-core fiber array and the multicore fiber array are made of polyphenylene sulfide.

9. The optical connection component according to claim 1, wherein the single-core fiber array and the multicore fiber array are made of glass.

10. An optical connection component comprising:

three or more cores that transmit optical signals along a first direction;

a first surface extending in a second direction intersecting the first direction and in a third direction intersecting both the first direction and the second direction; and a second surface extending in the second direction and the third direction and arranged with the first surface along the first direction, wherein each of the cores extends from the first surface to the second surface along the first direction, the three or more cores are disposed not to be arranged on one straight line on each of the first surface and the second surface, a core disposition on the first surface defined by the three or more cores is different from a core disposition on the second surface defined by the three or more cores; and a single-core fiber holding portion that holds a plurality of single-core fibers optically connected to the respective cores disposed on the first surface, wherein the single-core fiber holding portion is open toward the first surface, and has a plurality of holes corresponding to the plurality of single-core fibers.

11. The optical connection component according to claim 10, further comprising:

a gap between the single-core fiber holding portion and the first surface.

12. An optical connection structure connecting a plurality of single-core fibers and one or a plurality of multicore fibers via an optical connection component, wherein the optical connection component includes three or more cores that transmit optical signals along a first direction, a first surface extending in a second direction intersecting the first direction and in a third direction intersecting both the first direction and the second direction, and a second surface extending in the second direction and the third direction and arranged with the first surface along the first direction, each of the cores extends from the first surface to the second surface along the first direction, the three or more cores are disposed not to be arranged on one straight line on each of the first surface and the second surface, a core disposition on the first surface defined by the three or more cores is different from a core disposition on the second surface defined by the three or more cores, the plurality of single-core fibers are connected to the first surface, and the one or plurality of multicore fibers are connected to the second surface.

* * * * *